(12) United States Patent
Yu et al.

(10) Patent No.: US 8,641,934 B2
(45) Date of Patent: Feb. 4, 2014

(54) METHOD FOR FABRICATING LIGHT GUIDE PLATE

(75) Inventors: Tai-Cherng Yu, New Taipei (TW); Da-Wei Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 222 days.

(21) Appl. No.: 13/213,074

(22) Filed: Aug. 18, 2011

(65) Prior Publication Data

US 2012/0319314 A1 Dec. 20, 2012

(30) Foreign Application Priority Data

Jun. 15, 2011 (TW) ............................... 100120867 A

(51) Int. Cl.
*B29D 11/00* (2006.01)
(52) U.S. Cl.
USPC ............ 264/1.24; 264/2.7; 264/161; 264/340
(58) Field of Classification Search
USPC ............................. 264/1.1, 1.24, 2.7, 161, 340
See application file for complete search history.

(56) References Cited

U.S. PATENT DOCUMENTS

2006/0145398 A1* 7/2006 Bailey et al. .................. 264/338

FOREIGN PATENT DOCUMENTS

JP 6-201928 * 7/1994

* cited by examiner

*Primary Examiner* — Mathieu D. Vargot
(74) *Attorney, Agent, or Firm* — Altis Law Group, Inc.

(57) ABSTRACT

A method for fabricating a light guide plate includes the following steps. Injection molding a light guide plate to obtain a light guide plate with a stub. Cutting away the stub to obtain a light guide plate with a cut edge. Providing a thermal resetting apparatus having an nano release material layer. A thermal melting temperature of the nano release material layer is higher than that of the light guide plate, heating the thermal resetting apparatus to make a temperature of the nano release material layer higher than the thermal melting temperature of the nano release material layer. And resetting the cut edge of the light guide plate by contacting the nano release material layer of the thermal resetting apparatus with the cut edge of the light guide plate to obtain a light guide plate with a smooth edge.

7 Claims, 7 Drawing Sheets

METHOD FOR FABRICATING LIGHT GUIDE PLATE

BACKGROUND

1. Technical Field

The present disclosure relates to light guide plates, and particularly to a method for fabricating a light guide plate.

2. Description of Related Art

Light guide plates are widely used in backlight modules. The light guide plates are usually formed by injection molding. After being ejected from the mold, the light guide plates are usually in connection with a stub, which may be the injection gate. Such that, a cutting process and a polishing process are usually needed for forming a smooth edge of a light guide plate.

However, a polishing process will make powder fly and contaminate the light guide plate, and may cause damage to the light guide plate. Furthermore, a cut edge of the light guide plate may also lead to a collapse of the light guide plate during the polishing process.

What is needed, therefore, is a method for fabricating a light guide plate, which can overcome the above shortcomings.

BRIEF DESCRIPTION OF THE DRAWINGS

Many aspects of the present method for fabricating a light guide plate can be better understood with reference to the following drawings. The components in the drawings are not necessarily drawn to scale, the emphasis instead being placed upon clearly illustrating the principles of the present method for fabricating a light guide plate. Moreover, in the drawings, like reference numerals designate corresponding parts throughout the several views.

DETAILED DESCRIPTION

Embodiments of the present method for fabricating a light guide plate will now be described in detail below and with reference to the drawings.

Referring to FIGS. 1 to 7, a method for fabricating a light guide plate includes steps as follows.

Step 1, injection molding a light guide plate using a mold, then ejecting the molded product including a light guide plate 20 and a stub 12 in connection with the light guide plate 20. In the present embodiment, the stub 12 includes a part of injection gate (see FIG. 1). The light guide plate may be made of polymethylmethacrylate (PMMA), and the PMMA can be thermally melted at a temperature above 220° C. In alternative embodiments, the light guide plate may be made of other materials as long as the thermal melting temperature is lower than that of a thermal resetting apparatus 30 described below.

Figure 1:
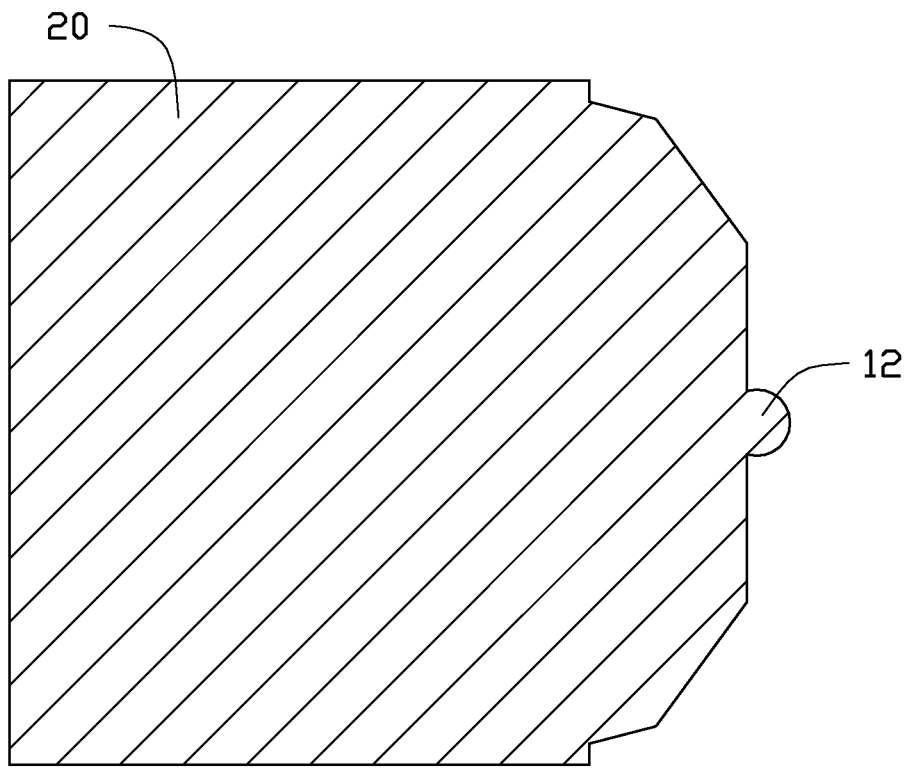
FIG. 1 is a schematic view of a light guide plate in connection with a stub.
Figure 2:
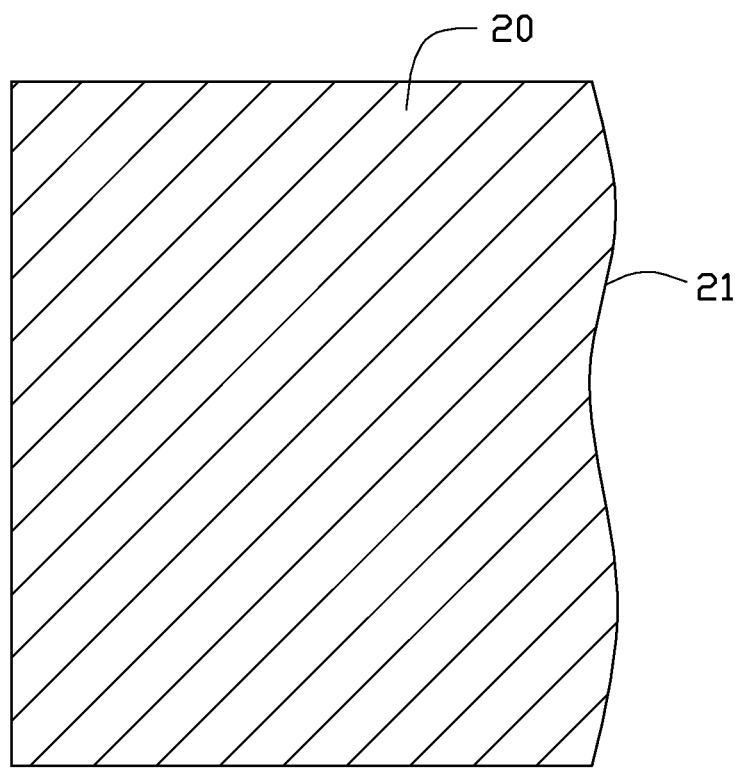
FIG. 2 is a schematic view of a light guide plate having a cut edge.

Step 2, cutting away the stub 12 using a cutting tool to obtain a light guide plate 20 having a cut edge 21 (see FIG. 2). The cut edge 21 needs to be trimmed further before the light guide plate 20 is finished.

Step 3, providing a thermal resetting apparatus 30. The thermal resetting apparatus 30 is fabricated with the following method.

First, a stainless steel substrate 32 is provided. In the present embodiment, the stainless steel is STAVAX stainless steel, and includes at least 13.6% chromium (Cr), 0.9% silicon (Si), 0.5% manganese (Mn) and 0.38% carbon (C). A thermal melting temperature of the stainless steel substrate 32 is higher than that of the light guide plate. For example, a STAVAX stainless steel can have a thermal melting temperature above 900° C.

Figure 3:
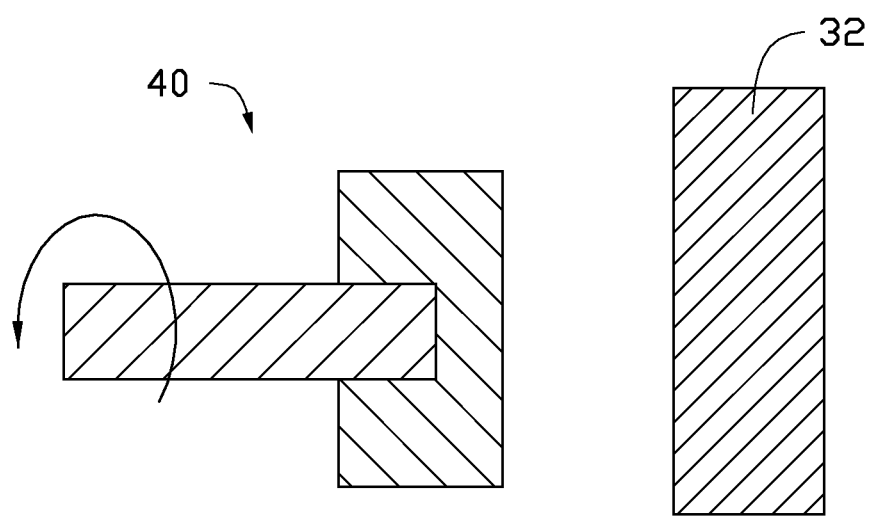
FIG. 3 is a schematic view of a polishing tool to polish a stainless steel substrate.

Second, polishing a surface of the stainless steel substrate 32 using a polishing tool 40 (see FIG. 3).

Figure 4:
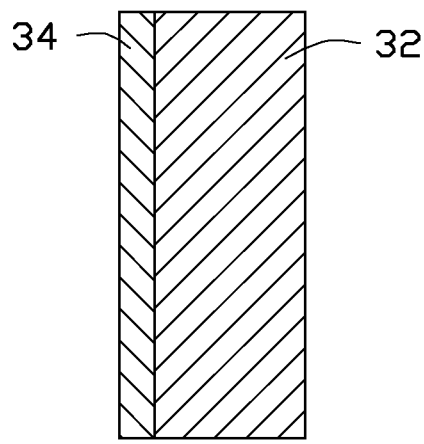
FIG. 4 shows a nano release material layer coated on a stainless steel substrate.

Next, forming a nano release material layer 34 on the polished surface of the stainless steel substrate 32 (see FIG. 4). The nano release material is a nano scale release material that has a fine texture, and thus can be firmly adhered to the polished surface. A molded product can be easily detached from the nano release material without damage to the molded product and the nano release material layer 34.

The forming of the nano release material layer 34 can be carried out by evaporation or sputtering. A thermal melting temperature of the nano release material layer 34 is higher than that of the light guide plate. In the present embodiment, the nano release material is diamond-like carbon (DLC), and the DLC still has a smooth surface at a high temperature such as 220° C. A thermal melting temperature of the DLC can be above 3000° C.

Figure 5:
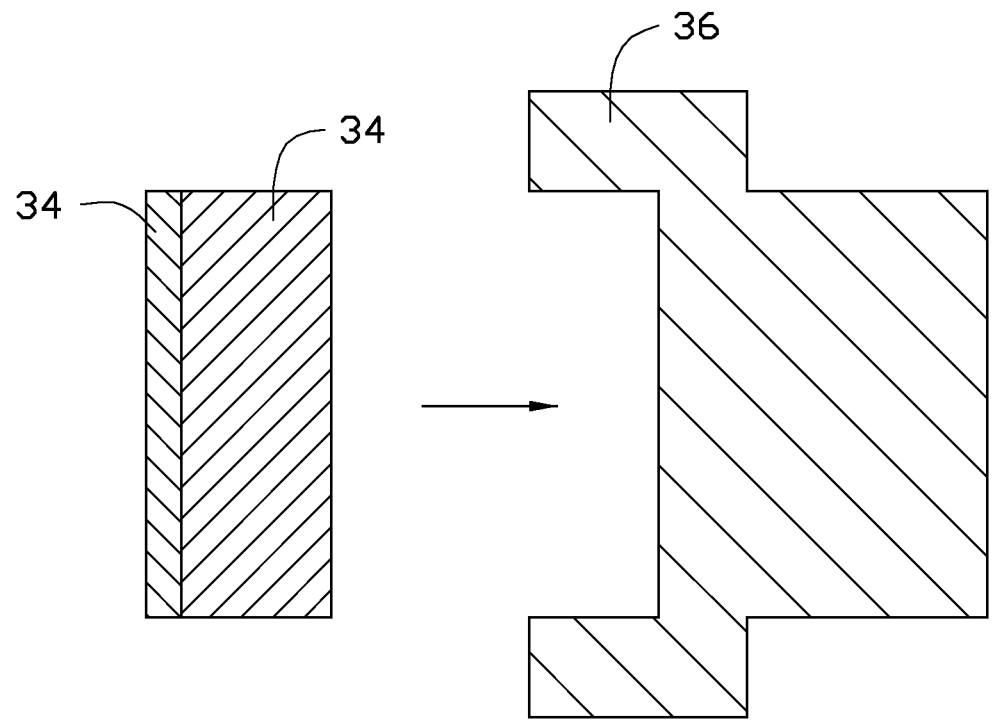
FIG. 5 is a schematic view of a heating fixture to fix the stainless steel substrate with the nano release material layer shown in FIG. 4.

Finally, see FIG. 5, the stainless steel substrate 32 with the nano release material layer 34 is fixed to a heating fixture 36, thereby obtaining the thermal resetting apparatus 30.

Step 4, heating the thermal resetting apparatus 30 to make a temperature of the nano release material layer 34 higher than the thermal melting temperature of the light guide plate 20 but lower than the thermal melting temperature of the nano release material layer 34.

Figure 6:
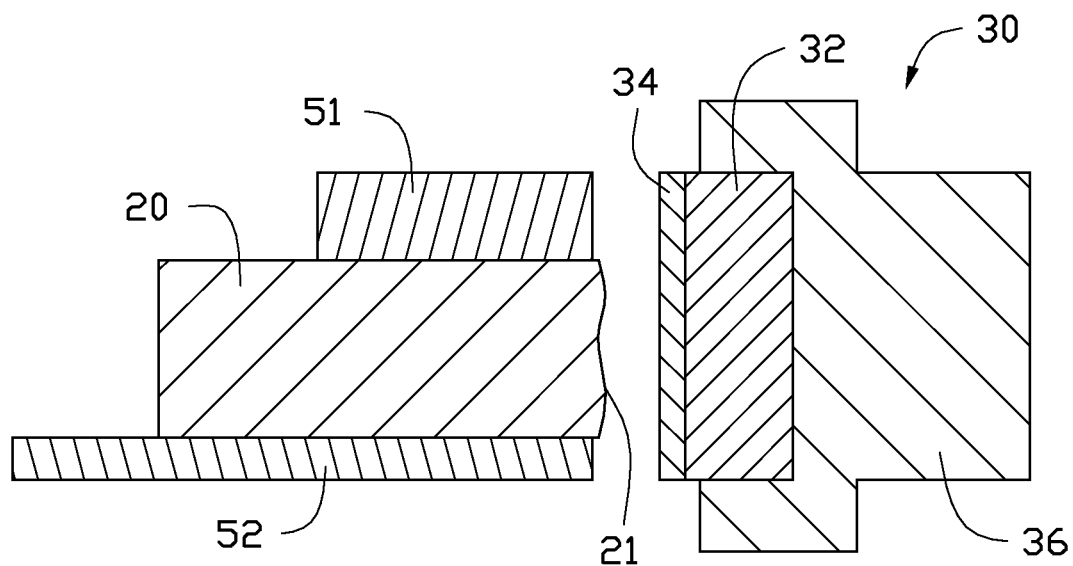
FIG. 6 shows a thermal resetting apparatus to reset the cut edge of the light guide plate of FIG. 2.

Step 5, see FIG. 6, resetting the cut edge 21 of the light guide plate 20 by contacting the nano release material layer 34 of the thermal resetting apparatus 30 with the cut edge 21 of the light guide plate 20. The light guide plate 20 can be fixed by a top plate 51 and a bottom plate 52, and the cut edge 21 is exposed to the outside. The thermal resetting apparatus 30 is moved to the light guide plate 20 to thermally reset the cut edge 21. As the temperature of the nano release material layer 34 is higher than the thermal melting temperature of the light guide plate 20, the cut edge 21 would be reset, and the nano release material layer 34 would not be damaged.

Figure 7:
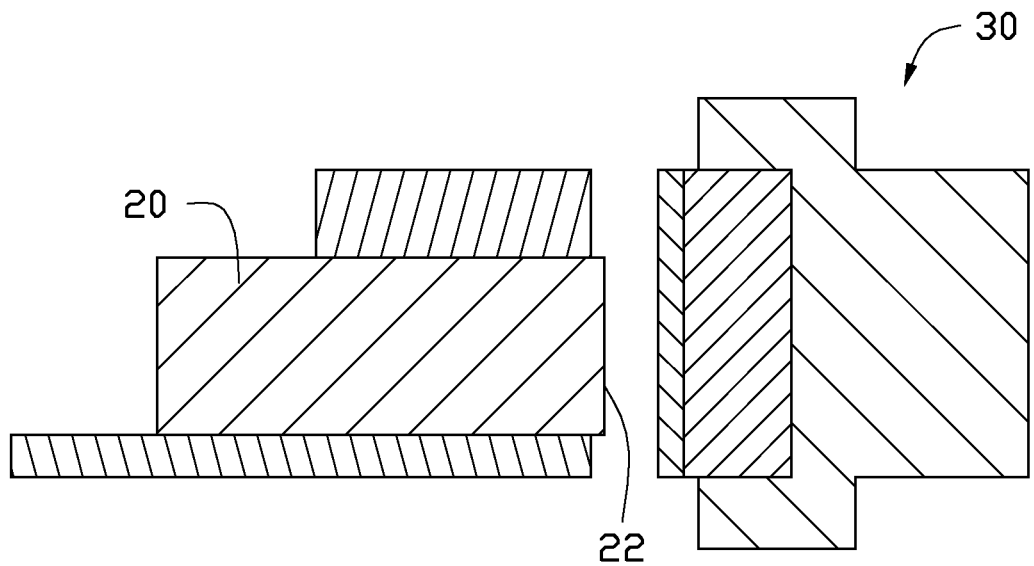
FIG. 7 shows the light guide plate has a smooth edge after being reset by the thermal resetting apparatus.

Referring to FIG. 7, after resetting, the cut edge 21 is changed to a smooth edge 22, which is imprinted the smooth surface of the nano release material layer 34.

With the above method, a polishing of the cut edge of the light guide plate can be avoided, thus reducing contamination and damage to the light guide plate.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A method for fabricating a light guide plate, the method comprising:

injection molding a light guide plate to obtain a light guide plate with a stub;

cutting away the stub to obtain a light guide plate with a cut edge;

providing a thermal resetting apparatus having an nano release material layer and a stainless steel substrate, the nano release material layer firmly adhered to a surface of the stainless steel substrate, a thermal melting temperature of the nano release material layer being higher than that of the light guide plate;

heating the thermal resetting apparatus such that a temperature of the nano release material layer is higher than the thermal melting temperature of the light guide plate, but lower than the thermal melting temperature of the nano release material layer; and treating the cut edge of the light guide plate by contacting the nano release material layer of the thermal resetting apparatus with the cut edge of the light guide plate to obtain a light guide plate with a smooth edge at the original cut edge portion.

2. The method of claim 1, wherein the thermal resetting apparatus further includes a heating fixture for heating and fixing the stainless steel substrate and the nano release material layer.

3. The method of claim 1, wherein before the nano release material layer is formed on the surface of the stainless steel substrate, the surface of the stainless steel substrate, to which the nano release material layer firmly adhered, is polished.

4. The method of claim 1, wherein the stainless steel substrate comprises at least 13.6% chromium, 0.9% silicon, 0.5% manganese and 0.38% carbon by weight.

5. The method of claim 1, wherein the nano release material is diamond-like carbon.

6. The method of claim 1, wherein the light guide plate is made of polymethylmethacrylate.

7. The method of claim 1, wherein the stub comprises an injection gate.

* * * * *